(12) United States Patent
Selvaggi et al.

(10) Patent No.: US 7,555,513 B2
(45) Date of Patent: Jun. 30, 2009

(54) SIMD PROCESSOR HAVING ENHANCED OPERAND STORAGE INTERCONNECTS

(75) Inventors: Richard J. Selvaggi, Doylestown, PA (US); Larry A. Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 655 days.

(21) Appl. No.: 10/940,150

(22) Filed: Sep. 13, 2004

(65) Prior Publication Data

US 2006/0095712 A1   May 4, 2006

(51) Int. Cl.
    *G06F 17/10* (2006.01)
(52) U.S. Cl. ........................ 708/420
(58) Field of Classification Search ............ 708/420
    See application file for complete search history.

(56) References Cited

U.S. PATENT DOCUMENTS

| | | | |
|---|---|---|---|
| 5,530,661 A * | 6/1996 | Garbe et al. | 708/420 |
| 5,659,780 A * | 8/1997 | Wu | 712/19 |
| 5,742,529 A * | 4/1998 | Mennemeier et al. | 708/201 |
| 6,282,556 B1 * | 8/2001 | Chehrazi et al. | 708/521 |
| 6,292,814 B1 | 9/2001 | Sazzad | |
| 6,526,430 B1 | 2/2003 | Hung et al. | |
| 6,529,930 B1 | 3/2003 | Sazzad et al. | |
| 7,054,895 B2 * | 5/2006 | Koba et al. | 708/201 |
| 7,085,795 B2 * | 8/2006 | Debes et al. | 708/603 |
| 7,126,991 B1 * | 10/2006 | Mimar | 375/240.16 |

OTHER PUBLICATIONS

Dmitri Fomine, Vladimir Tchernikov, Pavel Vixne and Pavel Chevtchenko, "VLIW/SIMD NeuroMatrix® Core", Research Center Module, Nov. 17, 2000, pp. 1-51.

Tomas Henriksson, "Introduction to Embedded Digital Signal Processor Design", Laboratory Reference, Sep. 5, 2003, pp. 1-25.

Chris Dick, Bob Turney, "Configurable Logic for Digital Signal Processing", Department of Electrical Engineer and Computer Science, Apr. 28, 1999, pp. 1-18.

Oxford Micro Devices, "Summary of A436™ Parallel Video DSP Chip", Jun. 26, 2001, pp. 1-8.

* cited by examiner

*Primary Examiner*—David H Malzahn
(74) *Attorney, Agent, or Firm*—McAndrews, Held & Malloy, Ltd.

(57) ABSTRACT

A SIMD processor includes an ALU having data interconnects facilitating the concurrent processing of overlapping data portions of at least one operand store. Such interconnects facilitate the calculation of shift-invariant convolutions, and sum of absolute differences between an operand in the operand store and another operand.

14 Claims, 6 Drawing Sheets

SIMD PROCESSOR HAVING ENHANCED OPERAND STORAGE INTERCONNECTS

FIELD OF THE INVENTION

The present invention relates generally to processors, and more particularly to single instruction multiple data (SIMD) processors including arithmetic logic units (ALUs) having operand store interconnects facilitating the execution of certain instructions.

BACKGROUND OF THE INVENTION

SIMD processors are best suited to performing the same operation on multiple pieces of data simultaneously. Typically, parallel processing portions of a single arithmetic logic unit (often viewed as individual parallel ALUs) operate on portions of operands simultaneously.

Certain calculations used in digital signal processing, on the other hand, repeatedly calculate the outcome of an operation applied to data that is shifted in time.

For example, shift invariant convolutions are often used in digital signal processing, to apply a frequency domain filter to a time domain representation of a signal. Specifically, the Nth order shift-invariant convolution of two discrete time signals $h(n)$ and $q(n)$ can be expressed mathematically as $$z(n)=h(0)*q(n)+h(1)*q(n-1)+\ldots+h(N-1)*q(n-N+1)$$

where N is the order of the convolution, $q(n)$, $n=0, 1, 2, \ldots$ is the sequence of samples input to the filter and $h(i)$, $i=0, 1, \ldots, N-1$ is the impulse response of the filter and $z(n)$, $n=0, 1, 2, \ldots$ is the output from the filter. In general the length of the sequence of input samples need not be bounded, if output samples are produced as input samples are received. For example given an impulse response $h(i)$, $i=0 \ldots N-1$ and the subsequence of N input samples starting from discrete time $t_0-N+1$:

$$q(t_0-N+1), \ldots, q(t_0-1), q(t_0)$$

the value of the convolution between $h(i)$ and $q(n)$ can be computed at discrete time t0. Further, given an impulse response $h(i)$, $i=0 \ldots N-1$ and the longer subsequence of $N+k-1$ input samples starting from discrete time $t0-N+1$, for some value of $k>1$:

$$q(t_0-N+1), \ldots, q(t_0-1), q(t_0), \ldots, q(t_0+k-1)$$

the value of the convolution between $h(i)$ and $q(n)$ can be computed at k discrete times $t_0 \ldots t_0+k-1$.

For convenience, and without loss of generality, we define a new representation of the impulse response as $a(i)$, $i=0 \ldots P-1$ where $$a(i)=h(N-1-i) \text{ for } i<N$$

$$a(i)=\text{not defined}, N \leq i < P$$

and $N \leq P$.

Specifically $a(0)=h(N-1), a(1)=h(N-2), \ldots, a(N-1)=h(0)$

Similarly without loss of generality we define a representation of the subsequence of $N+k-1$ input samples starting from discrete time $t_0-N+1$ as $x(n)$, $n=0 \ldots P-1$ where $$x(n)=q(n+t_0-N+1) \text{ for } n<N+k-1$$

$$x(n)=\text{not defined}, N+k-1 \leq n < P$$

In a similar vein we lastly define a representation of the subsequence of k output samples starting from discrete time $t_0$ as $y(n)$, $n=0 \ldots k-1$ where $$y(n)=z(t_0+n), 0 \leq n < k$$

With these definitions in place an alternate representation of the convolution can be expressed as:

$$y(n)=a(0)*x(n)+a(1)*x(n+1)+\ldots+a(N-1)*x(n+N-1),$$
$$n=0 \ldots k-1$$

Conventional processors calculate shift-invariant convolutions, $y(n)$ by executing a sequence of basic arithmetic operations such as multiply, add and multiply-and-accumulate.

As a further example, pattern matching techniques often require a processor to assess a best match of a series of target values (referred to as a target) and reference samples sequential in time or spatial position. Expressed mathematically, it is often desirable to assess j, for which the dissimilarity between the target $a(0)a(1) \ldots a(N-1)$ and reference samples $x(j)x(j+1) \ldots x(j+N-1)$ is minimized. It is often similarly desirable to find a pattern match of the target to interpolated samples of the reference. Again, conventional processors perform such pattern matching operations by executing a sequence of basic arithmetic operations.

Clearly, a SIMD processor capable of calculating shift invariant convolutions for multiple values of n concurrently would be beneficial, particularly in computationally intensive applications that benefit from high speeds. Similarly, a processor capable of performing several pattern matching operations concurrently would provide benefits.

SUMMARY OF THE INVENTION

Accordingly, an enhanced SIMD processor includes an ALU having data interconnects facilitating the concurrent processing of overlapping data portions of at least one operand store. Such interconnects may facilitate the calculation of shift-invariant convolutions, and pattern matches.

In accordance with an aspect of the present invention, a SIMD processor includes an ALU having a plurality of logic blocks, each of the logic blocks includes a first set of inputs and a second set of inputs. A plurality of first interconnects comprising $N \times m_1$ data lines, interconnects a plurality of N data portions of a first operand to the first inputs of each of the logic blocks thereby providing the same data to the first set of inputs of each of the logic blocks. A plurality of groups of second interconnects, with each of the groups comprising $N \times m_2$ data lines, interconnects a different subset of N data portions of a second operand to each of the second set of inputs of the plurality of logic blocks. Each of the subsets of N data portions of the second operand has data units in at least one other of the subsets of N data portions of the second operand.

In accordance with an aspect of the present invention, a method of calculating the $N^{th}$ order convolution of sub-vectors of entries of vectors $A=a(0)a(1)a(2) \ldots a(P-1)$ and $X=x(0)x(1)x(2) \ldots x(P-1)$ at a single instruction, multiple data (SIMD) processor, includes concurrently calculating $y(i)=a(j)*x(i)+a(j+1)*x(i+1) \ldots +a(j+N-1)*x(i+N-1)$, for $i=0$ to $i=k-1$ wherein each $y(i)$ is calculated by a logic block of the SIMD processor.

In accordance with yet a further aspect of the present invention, a method of calculating the $N^{th}$ order sum of absolute differences between a target of the form $a(0)a(1)a(2) \ldots a(N-1)$ and reference samples of the form $x(j)x(j+1) \ldots x(j+N-1)$ at a single instruction, multiple data (SIMD) processor, includes concurrently calculating, $y(i)=|a(0)-x(i)|+|a$ $(1)-x(i+1)|+ \ldots +|a(N-1)-x(i+N-1)|$, for $i=0$ to $i=k-1$ wherein each $y(i)$ is calculated by a logic block of the SIMD processor.

In accordance with yet another aspect of the invention, the $N^{th}$ order sum of absolute sum and differences between a target of the form $a(0)a(1)a(2) \ldots a(N-1)$ and sub-samples of reference samples of the form $x(j)x(j+1) \ldots x(j+N-1)$ at a single instruction, multiple data (SIMD) processor may be calculated. A method includes interpolating adjacent data units $x(i)$ of $x(j)x(j+1) \ldots x(j+N-1)$ to form interpolated data units $l(j)l(j+1) \ldots$; concurrently calculating, $y(i)=|a(0)-l(i)|+|a(1)-l(i+1)|+ \ldots +|a(N-1)-l(i+N-1)|$, for $i=0$ to $i=k-1$. Each $y(i)$ is calculated by a logic block of the SIMD processor.

In accordance with yet another aspect of the present invention, a SIMD processor includes an arithmetic logic unit (ALU) comprising first and second logic blocks. Each of the logic blocks includes a first set of inputs and a second set of inputs; a plurality of first interconnects, interconnecting a plurality of data portions of a first operand to the first inputs of each of the first and second logic blocks, thereby providing the same data to the first set of inputs of the first and second logic blocks; and first and second groups of second interconnects, with each of the first and second groups of interconnecting a different subset of data portions of a second operand to the second set of inputs of one of the logic blocks. At least some of the interconnects of the first and second groups provide the same data storage portions from the second operand store to the second set of inputs of the first and second logic blocks.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
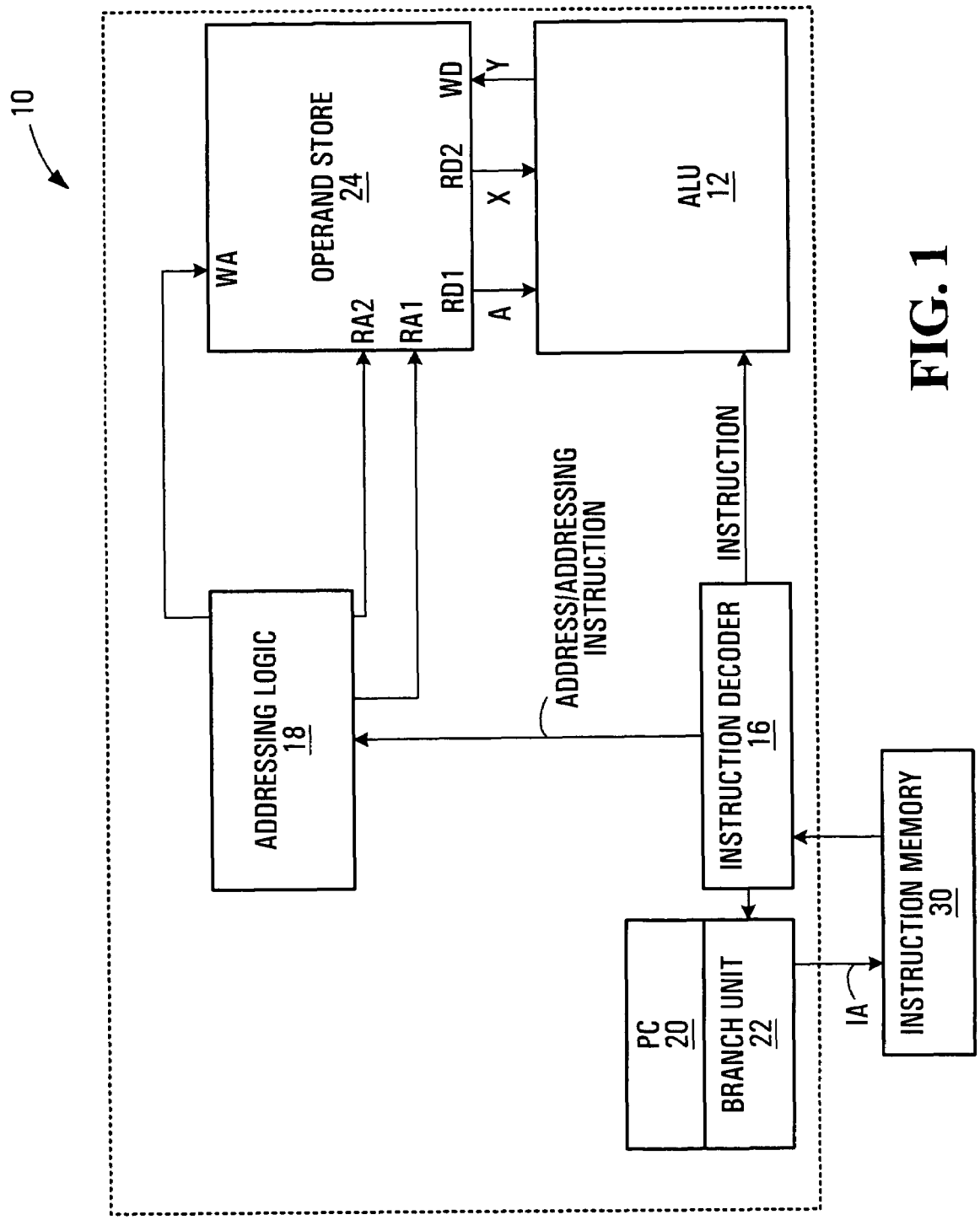
FIG. 1 is a schematic block diagram of a SIMD processor, exemplary of embodiments of the present invention.

FIG. 1 schematically illustrates a single instruction, multiple data ("SIMD") processor 10 exemplary of an embodiment of the present invention. Processor 10 includes an arithmetic and logic unit ("ALU") 12 in communication with operand storage 24; and instruction decoder 16. Instruction decoder 16 is further in communication with a program counter 20 and branch unit 22.

Processor readable instructions are stored within instruction memory 30. Resulting calculations performed by processor 10 may be stored in operand storage 24 in communication with instruction decoder logic 18. Operand storage 24 may be any combination of addressable storage elements including processor registers and memory, addressable by individual locations. In the depicted embodiment, operand storage 24 forms part of processor 10. A person of ordinary skill will readily recognize that storage 24 may be any suitable combination of memory and registers local to processor or computer readable memory external to processor 10.

Addressing logic 18, based on instructions as decoded by instruction decoder 16 controls which elements within operand storage processed by processor 10 is accordingly adapted to address the various combinations of addressable elements within operand storage 24.

SIMD architecture is generally well known, and described in John L. Hennessy, David A. Patterson, David Goldberg, Computer Architecture: A Quantitative Approach (Morgan Kaufmann, 2002)—ISBN: 1558605967, the contents of which are hereby incorporated herein by reference.

As will be appreciated, processor 10 fetches instructions to be executed from instruction memory 30, at addresses specified by program counter 20. Instructions are decoded by instruction decoder 16. Branch unit 22 adjusts program counter 20 in accordance with decoded instructions. Arithmetic or logical instructions within decoded processor instructions are provided to ALU 12 which, in turn, operates on data provided by one or more operand stores in accordance with a decoded instruction to generate a result. Results are provided to a result store. Typically operand stores and result store are contained within operand storage 24. Generally, operand read data addresses and write data addresses may form part of a provided instruction and may be decoded by instruction decoder 16.

Notably, operand storage 24 includes two read ports, and thus may concurrently provide operand data A and X from two read addresses at data lines RD1 and RD2, as specified by read data address lines RA1 and RA2. Data at write data lines WD is written to operand storage 24 at a location specified by WA.

Conveniently ALU 12 includes multiple parallel logic blocks for performing the same arithmetic or logical instruction on multiple data elements. As a result SIMD processors, generally, (and in particular SIMD processor 10) are particularly well suited for certain classes of arithmetic calculations.

Figure 2:
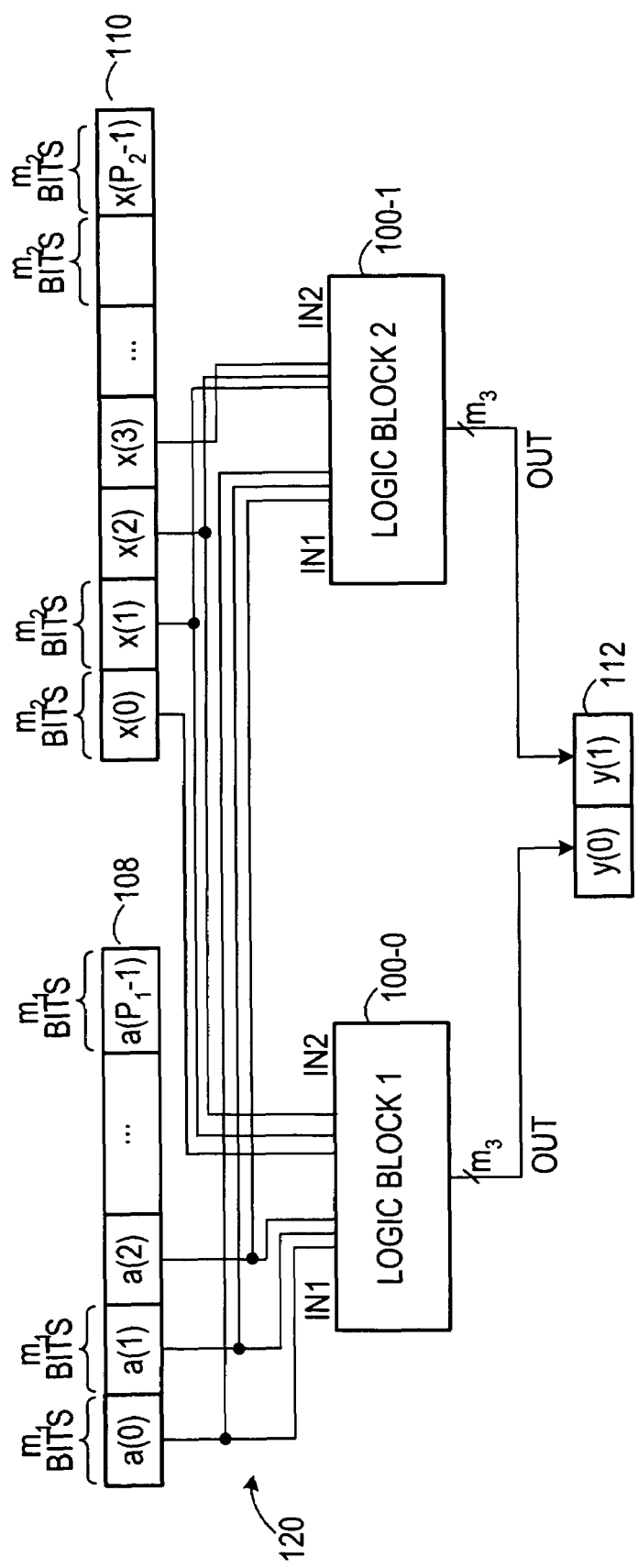
FIG. 2 is a simplified schematic block diagram of an ALU forming part of the SIMD processor of FIG. 1.

A simplified schematic block diagram of portions of an ALU 12 is illustrated in FIG. 2. ALU 12 includes at least two logic calculation blocks 100-0 and 100-1. Depicted logic blocks 100-0, 100-1 are identical. As illustrated, each logic block 100-0, 100-1 includes two sets of inputs IN1 and IN2. Each logic block 100-0, 100-1 performs a logical operation on data at its two sets of inputs. An interconnect fabric 120 interconnects the two sets of inputs of the plurality of logic blocks 100-0 and 100-1 to operands 108, 110 having content A and X. Exemplary of embodiments of the present invention, operands A and X are retrieved from operand store 24, and are accessible in partitions of $P_1$ and $P_2$ data portions, respectively. In the depicted embodiment, each data portion of operand 108 is made up of a group of $m_1$ adjacent bits. Each data portion of operand 110 is made up of a group of $m_2$ adjacent bits. A and X may thus be viewed as $P_1$ and $P_2$ dimensional vectors. Interconnect fabric 120 may interconnect the logic block inputs to read data lines of operand storage 24 (FIG. 1).

Results calculated by logic blocks 100-0 and 100-1 may be combined into results data 112. Results data 112 may be written back into operand storage 24 (as for example specified at write data address lines WA). Results data 112 is accessible in data portions having bit size of $m_3$.

Interconnect fabric 120 interconnects to provide operands 108 and 110 to logic blocks 100-0, 100-1 to facilitate certain arithmetic or logic calculations as detailed below. In its simplest form, interconnect fabric 120 interconnects N of the $P_1$ data units of operand 108 to the first logic block 100-1 (with $N \leq P_1$), and the same N of the $P_1$ data units to the second logic block 100-2. Interconnect fabric 120 further provides non-identical subsets of the $P_2$ data units of operand 110 to each of the first and second logic blocks. In the depicted embodiment interconnect provides N-element subsets of the $P_2$ data units of operand 110 (with $N<P_2$). At least one of the N subsets is provided to each of the two logic blocks. In the example of FIG. 2, x(1) and x(2) are provided to both logic block 100-0 and 100-1.

Now, two identical logic blocks 100-0, 100-2, allow for the concurrent calculation of op(A,$X_1$) and op(A,$X_2$), where A is an $Nxm_1$ bit vector, $X_1$ and $X_2$ are $Nxm_2$ bit subsets of vector X, and op represents the arithmetic or logical operation performed by logic blocks 100-0, 100-1.

Now, combination of two or more logic blocks 100-0 and 100-1 and a suitable interconnect fabric 120, results in an ALU 12 that is particularly well suited to calculate shift-invariant convolutions of two operands. As noted, shift invariant convolutions are often used in digital signal processing, to apply a frequency domain filter to a time domain representation of a signal. Specifically, using the terminology developed above, the $N^{th}$ order shift-invariant convolution of two discrete time signals can be expressed mathematically as $$y(n) = a(0)*x(n) + a(1)*x(n+1) + \ldots + a(N-1)*x(n+N-1),$$
$$n = 0 \ldots k-1 = A' * X(n)$$

where N is the order of the convolution, and A=[a(0) . . . a(N−1)]', an Nx1 column vector of coefficients, and X(n)=[x (n) . . . x(n+N−1)]', an Nx1 column vector.

Typically, the vector a(0) . . . a(N−1) represents an ordering of filter coefficients, and x(n) . . . x(n+N−1) represents N samples of an input signal. Shift invariant convolutions are further detailed in A. V. Oppenheim and R. W. Schafer. Digital Signal Processing. Prentice-Hall, Inc.: Englewood Cliffs, N.J., 1975, the contents of which are hereby incorporated by reference. Each coefficient a(i) and each x(i) sample of the input signal may be represented as an m bit integer.

Then y(n)=A'*X(n), where A' is the vector transpose of A, and the * represents standard matrix multiplication (in this case the inner product between two vectors).

Now, it may be observed that y(n)=A'*X(n), y(n+1)=A'*X (n+1), y(n+k−1)=A'*X(n+k−1).

As may now be apparent, provided logic blocks 100-0, 100-1 are capable of calculating an inner product, with an appropriate interconnect fabric 120, logic blocks 100-0 and 100-1 as depicted in FIG. 2 may be used to calculate y(n) and y(n+1), concurrently. Use of k blocks and an appropriate interconnect fabric as depicted in FIG. 3 allows concurrent calculation of all y(n) to y(n+k−1).

Figure 3:
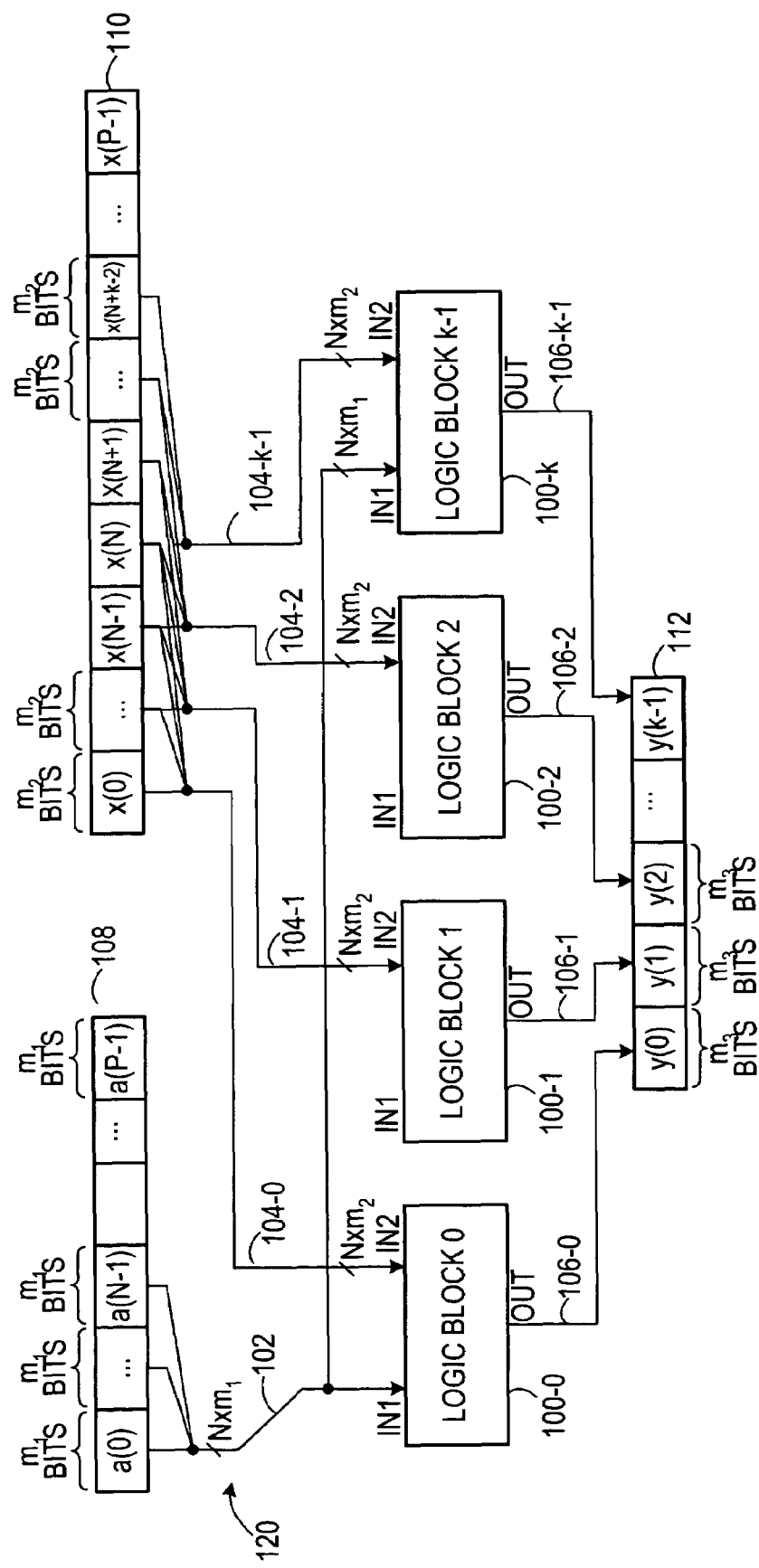
FIG. 3 is a further schematic block diagram of the ALU of FIG. 2.

To better appreciate this, a portion of ALU 12 of processor 10 is again schematically depicted in FIG. 3. For ease of illustration, and without limiting the generality of possible embodiments, $m_1=m_2=m$, $P_1=P_2=P$ in the embodiment of FIG. 3.

As illustrated ALU 12 includes k logic blocks 100-0, 100-1 . . . 100-(k-1) (individually and collectively logic blocks 100) each operable to calculate the N point inner product of its inputs. Each logic block 100 has first and second sets of Nxm bit inputs and calculates the N point inner product of its inputs.

Interconnect fabric 120 includes a plurality of first interconnects 102, interconnecting a plurality of (N) m-bit data storage portions of operand 108 (in this case N groups of m adjacent bits of data within operand 108) to one set of inputs of each of operation blocks 100. Thus, in the depicted embodiment, each of first interconnects 102 is formed as Nxm data lines. Fabric 120 further includes interconnects 102 interconnecting the first set of inputs of the various logic blocks 100 so that each of the logic blocks 100 receives the same portion (i.e. N, m-bit data portions) of operand 108. That is, each logic block 100 receives at one of its inputs a(j)a(j+1) . . . a(j+N−1), with N+j<P, where each a(i) represents a data storage unit of m adjacent bits of operand 108. For simplicity, in the embodiment of FIG. 3, j is chosen to equal 0.

Further, each logic block 100 is provided with a different subset of N, m bit data storage portions of operand 110 by way of a group of second interconnects 104-0, 104-1 . . . 104-(k-1) (individually and collectively second interconnects 104). Each group of second interconnects 104 provides a subset of N, m bit data portions of operand 110, each subset offset from another group by m bits (i.e. one data unit) so that one group of interconnects 104-0 provides x(0), x(1), . . . , x(N−1) to the first logic block, the second group of second interconnects 104-1 provides bits x(1), x(2), . . . , x(N) to logic block 100-1. The third group of second interconnects 104-2 similarly provides bit groups x(2), x(3), . . . , x(N+1) to logic block 100-2. The $i^{th}$ interconnect 104-i provides the group consisting of x(i), x(i+1), . . . , x(i+N−1) to the $i^{th}$ logic block 100-i. Again x(i) represents a group of m adjacent bits within operand X.

Put another way, each group of interconnects 104 provides a N element subset of entries of vector X to a logic block 100. Each subset consists of N adjacent entries of vector X. The multiple subsets are each offset by one entry. As such, each group of second interconnects 104 is formed as Nxm data lines, interconnecting an Nxm bit subset of the operand X.

Conveniently, then, first and second interconnects 102 and 104 each provide Nxm bits of data to the $i^{th}$ logic block 100-i.

Each identical logic block 100, in turn, includes combinational logic to calculate y(n) (as defined above, for j=0), the inner product between A and X(n). So the $i^{th}$ logic block 100-i, calculates $$y(i)=a(0)*x(i)+a(1)*x(i+1)+ \ldots +a(N-1)*x(i+N-1)$$

k blocks 100 concurrently calculate y(0),y(1) . . . y(k−1), the shift invariant Nth order convolution of h(n) and q(n). Each y(i) has $m_3$ bits. All y(i)s may be concatenated into results data 112 and stored in operand store 24. Interconnects 106-0, 106-1 . . . 106-(k-1) are groups of $m_3$ bit data lines each providing result y(i) to results data 112.

As noted, first and second operands 108, 110 and results data 112 are read from or written to operand storage 24. As such, fabric 120 may be formed of interconnects 102, 104 and 106 in the form of direct or indirect electrical interconnects, in communication with operand storage 24. First and second operands may, for example, be read from memory or registers of processor 10.

Conveniently then, SIMD processor 10 may concurrently calculate the Nth order convolution for k values (i.e. y(0) y(1) . . . y(k−1)) with a single instruction, in the form

CONVOLUTION_N: OPERAND1, OPERAND2, RESULT where operand1, operand2 and result identify the locations of operands 108, 110 and results data 112 within operand storage 24.

For example, ALU 12 may perform $4^{th}$ order shift invariant convolutions in a SIMD processor whose operand stores store 8 samples of data, each sample having 8 bits (i.e. m=8). In this case the processor may fetch 4×8 bits of the coefficient vector A from operand 108, and 4 subsets of data vector X, each subset having 4×8 bits, from operand 110, and compute an output Y of length 4×8 bits. The results data 112 may be written back to the operand store 24 with appropriate padding, or can be added to a vector accumulator. Note that not all data from operand 110 need be used in generating the reduced set of outputs y(3) . . . y(0). In this case the m bits representing x(7) from operand 110 would be ignored.

Interconnect fabric 120 of logic blocks 100 depicted in FIG. 3 may be easily adapted to calculate shifted pattern matches, using logic blocks that calculate a difference metric between N elements of a match target a(0)a(1) . . . a(P−1), and N elements of a reference x(0)x(1). . . . x(P−1). That is, it is often desirable to assess the value of j for which the dissimilarity between a(0)a(1) . . . a(N−1) and x(j)x(1+j) . . . x(j+N−1) is minimized. A difference metric commonly used to measure dissimilarity between vectors is the sum of absolute differences of vector components.

As noted the each logic block 100 is provided with N data units of target A, and a unique N entry subset of reference X having N data units. That is, the $i^{th}$ logic block 100-$i$ is provided with entries a(0+j)a(1+j) . . . a(N−1+j), and x(i)x(i+1) . . . x(i+N−1). Again, for simplicity of illustration, j=0.

Figure 4:
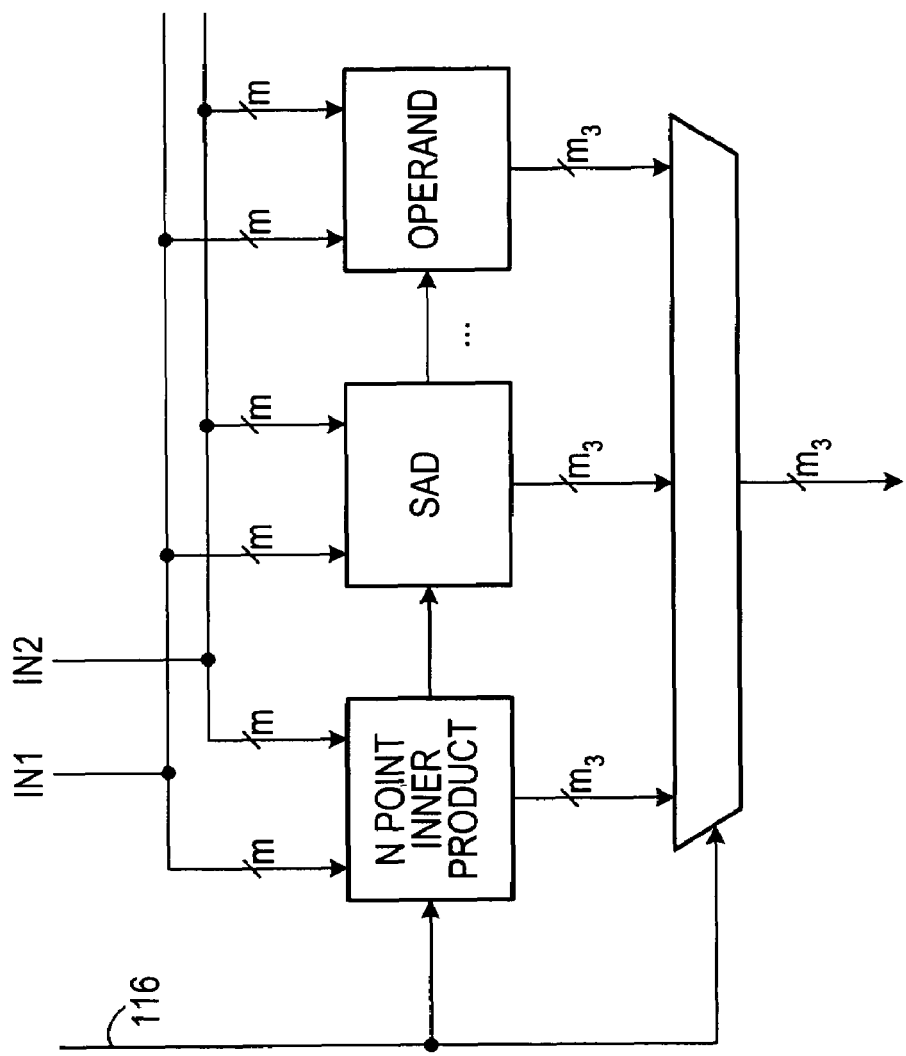
FIG. 4 is a simplified schematic block diagram of a logic block forming part of the ALU of FIGS. 2 and 3.

As such, each logic block 100 may further calculate the N-point sum of absolute differences (SAD) at its inputs to determine a difference metric between a target in A, and N data units of the reference X. FIG. 4 accordingly illustrates logic block 100 including two different arithmetic or logical functions, one implemented by each of logic circuits 118. As illustrated, logic block 100 includes logic to perform multiple operations. Select lines 116, select which of the multiple groups of logic circuits 118 are currently active. An optional data selector may further select which outputs to provide from block 100. Select lines 116 may be driven by bits of the instruction provided by instruction decoder 16 to ALU 10 (FIG. 1).

Thus, the $i^{th}$ logic block 100-$i$ may calculate either the N point inner product, or N point sum of absolute differences.

Specifically, using the same values at its inputs, the $i^{th}$ logic block 100-$i$ may calculate, $$y(i)=a(0)*x(i)+a(1)*x(i+1)+ \ldots +a(N-1)*x(i+N-1),$$
or $$SAD(i)=|a(0)-x(i)|+|a(1)-x(i+1)|+ \ldots +|a(N-1)-x(i+N-1)|$$

k logic blocks 100 can thus calculate SAD(0), SAD(1) . . . SAD(k−1). Again, all sum of absolute differences may be concatenated and stored in operand storage 24 by way of interconnects 116. As well, an optimal pattern matching j may be assessed by determining the smallest of the calculated sum of absolute differences, reflecting the value of j for which the dissimilarity between a(0)a(1) . . . a(N−1) and x(0+j)x(1+j) . . . x(j+N−1) is minimized.

As will be appreciated, although exemplified ALU 12 incorporates logic blocks 100 that calculate N point inner products and N point sum of absolute differences, logic blocks 100 could easily be adapted to calculate other metrics, such as the P point sum of absolute differences, P point inner products, P point Euclidean distances between portions of the match target A and the reference X, and the like. Each calculation could be performed in response to a different processor instruction that may take the form of the CONVOLUTION_N instruction set out above. The number of logic circuits 118 incorporated in each logic block 100 will be limited by the number of interconnects 116 and conventional fabrication constraints.

Figure 5:
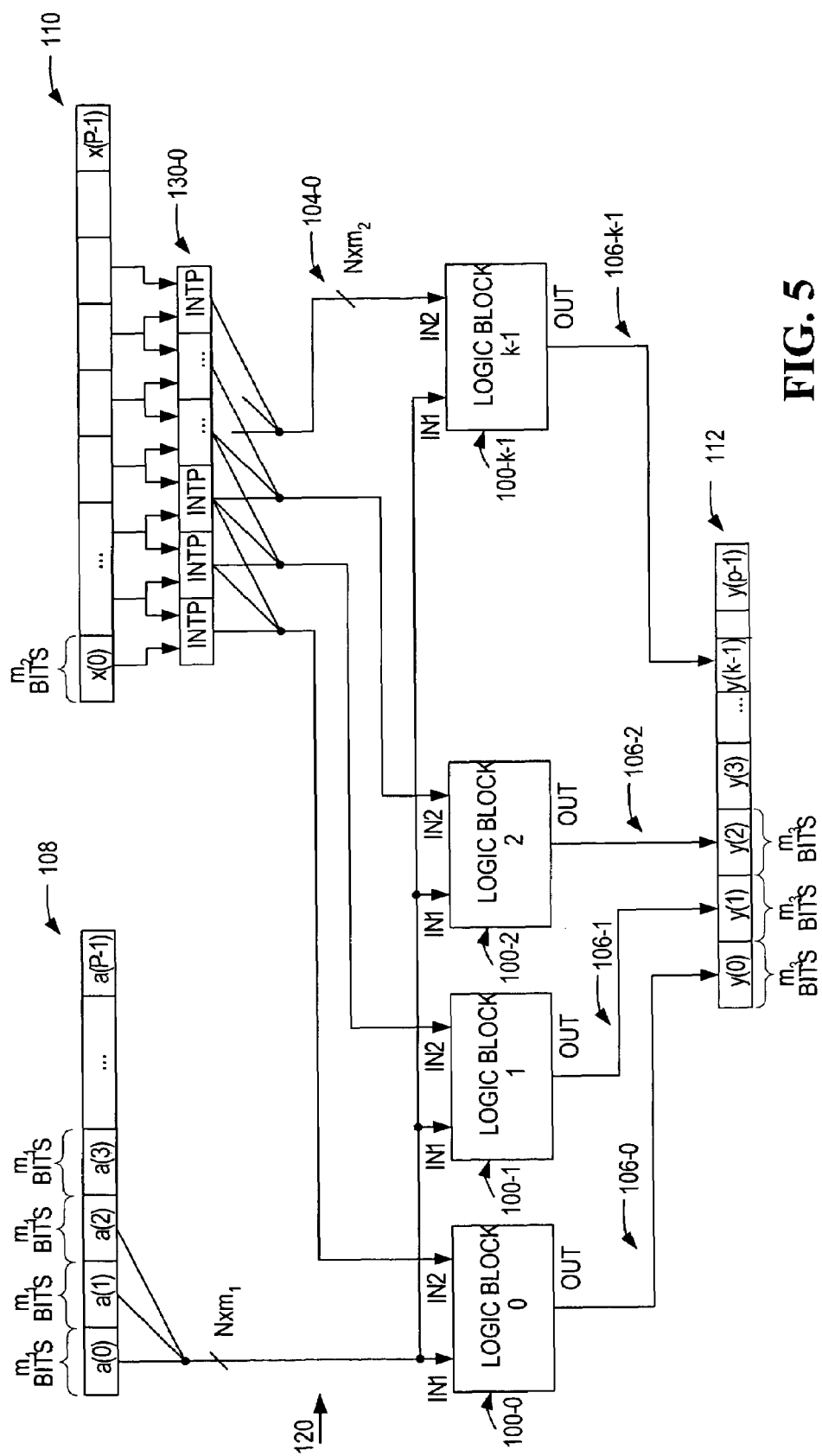
FIG. 5 is a schematic block diagram of yet a further ALU, exemplary of an embodiment of the present invention.
Figure 6:
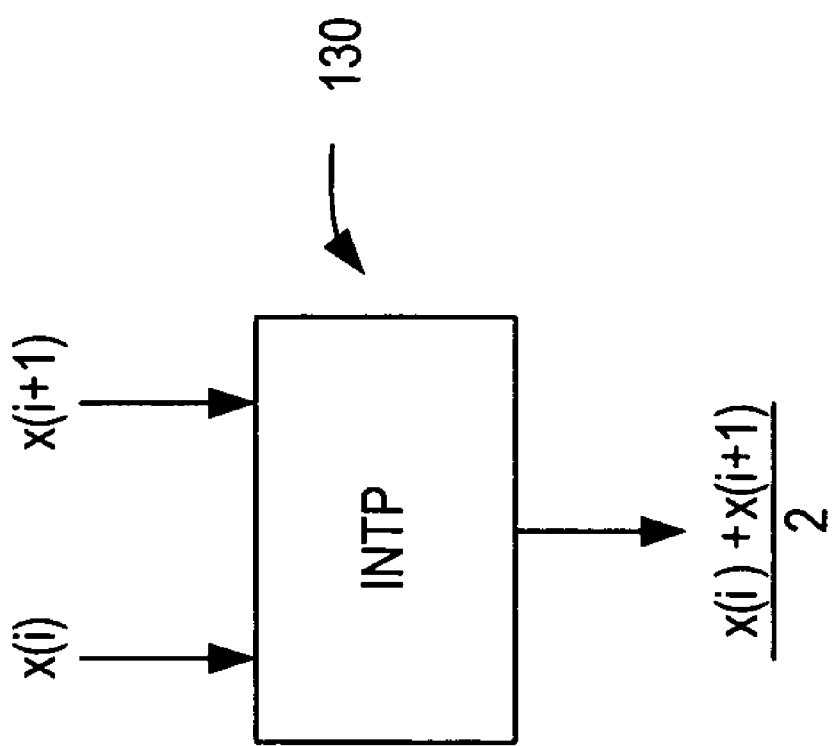
FIG. 6 is a block diagram of an interpolator used in the ALU of FIG.

In an alternate embodiment, illustrated in FIG. 5, an ALU 12' otherwise identical to ALU 12, of FIG. 3 may further include a plurality of interpolators 130-0, 130-1, . . . 130-($m$-1) (individually and collectively interpolators 130) interposed between the partitions of operand 110, and interconnect fabric 104. An example interpolater 130 is illustrated in FIG. 6. Each of interpolators 130 accordingly receives portions of operand 110, and calculates an interpolated result for comparison with corresponding portions in A. Example interpolator 130 is a linear interpolator producing one output sample l from q input samples. For example, interpolator 130-1 is provided with two adjacent data units x(0) and x(1), and may calculate data unit l(0)=x(0.5), from inputs x(0) and x(1). Thus, if the vector X, represents samples of x(n), interpolators 130 effectively calculate X offset by 0.5 units. More generally, the $i^{th}$ interpolator is provided data units x(i) and x(i+1) and calculates data unit l(i)=(x(i)+x(i+1)/2). Other forms of interpolation are of course also possible. For example, interpolators 130 could be replaced with higher order linear interpolators.

Now, as will be appreciated, a SIMD processor and ALU exemplary of embodiments of the present invention may include logic blocks equivalent to logic blocks 100 and suitable interconnects. Results of calculations of logic blocks 100 may be stored in a result store as dictated by the instruction invoking use of logic blocks 100. Similarly, although exemplified logic blocks operate on N×m sized operand and result stores, and calculate $N^{th}$ order convolutions and SADs, varied data unit bit sizes and order operations are possible, by modifying the number of interconnects, and logic blocks 100 in manners understood by those of ordinary skill.

SIMD processors and ALUs exemplary of embodiments of the present invention may be formed using conventional manufacturing techniques, including very large scale integration techniques.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A single instruction multiple data (SIMD) processor comprising:

an arithmetic logic unit (ALU) comprising:

a plurality of logic blocks, each of said logic blocks comprising a first set of inputs and a second set of inputs;

a plurality of first interconnects comprising N×m$_i$ data lines, interconnecting a plurality of N data portions of a first operand to said first inputs of each of said logic blocks, thereby providing the same data to said first set of inputs of each of said logic blocks, wherein said first operand represents data in the form a(0)a(1) a(2). . . a(P−1) , wherein each a(i) represents one of said data portions of said first operand, and wherein said plurality of first interconnects provides N data portions of said data in the form, a(j)a(j+1)...a(j+N−1), to said first set of inputs of each of said logic blocks, where P>N;

a plurality of groups of second interconnects, each of said groups comprising $N \times m_2$ data lines and interconnecting a different subset of N data portions of a second operand to each of said second set of inputs of said plurality of logic blocks, with each of said subsets of N data portions of said second operand having data units in at least one other of said subsets of N data portions of said second operand, wherein said second operand represents data in the form x(0)x(1)x(2)... wherein each x(i) represents one of said data portions of said second operand, and wherein each of said second group of interconnects provides a subset of said data portions in said second operand in the form x(n)x(n+1)...x(n+N−1), to second inputs of an interconnected one of said logic blocks;

wherein each of said logic blocks calculates, from data at its first and second inputs, $$a(j)*x(n)+a(j+1)*x(n+1)\ldots+a(j+N-1)*x(n+N-1).$$

2. The processor of claim 1, wherein N=4.

3. The processor of claim 1, wherein each of said logic blocks is further operable to calculate, from data at its first and second inputs, $$|a(j)-x(i)|+|a(j+1)-x(i+1)|+\ldots+|a(j+N-1)-x(i+N-1)|$$

in dependent on an instruction provided to said processor.

4. The processor of claim 1, wherein said processor comprises 1st to kth logic blocks, and for the of said logic block n=i−1.

5. The processor of claim 1, wherein said processor comprises 1st to kth logic blocks, and for the ith of said logic block n=i.

6. The processor of claim 5, wherein j=0.

7. The processor of claim 5, further comprising a combining circuit to form a combined output of said logic blocks, to provide a result of the form $$y(0)y(1)\ldots y(k)$$

where each $y(i)=a(j)*x(i)+a(j+1)*x(i+1)\ldots+a(j+N-1)*x(i+N-1)$ and is provided by one of said logic blocks.

8. The processor of claim 7, further comprising a resultant register for storing said result.

9. The processor of claim 5, wherein each a(i) comprises m bits.

10. The processor of claim 9, wherein each x(i) comprises m bits.

11. The processor of claim 10, further comprising a first register, and wherein said first operand is obtained by reading data from said first register.

12. The processor of claim 11, further comprising a second register, and wherein said second operand is obtained by reading data from said second register.

13. The processor of claim 10, wherein said first operand is obtained by reading data from a memory location within processor readable memory interconnected with said processor.

14. The processor of claim 13, wherein said second operand is obtained by reading data from a memory location within processor readable memory interconnected with said processor.

* * * * *